(12) United States Patent
Jannard et al.

(10) Patent No.: US 9,871,900 B2
(45) Date of Patent: *Jan. 16, 2018

(54) CELLPHONE WITH CONTOURED SURFACES

(71) Applicant: HoudiniX LLC, Eastsound, WA (US)

(72) Inventors: James H. Jannard, Las Vegas, NV (US); Peter Jarred Land, Los Angeles, CA (US)

(73) Assignee: Houdinix LLC, Eastsound, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,269

(22) Filed: Apr. 7, 2017

(65) Prior Publication Data

US 2017/0214777 A1    Jul. 27, 2017

Related U.S. Application Data

(63) Continuation of application No. 14/247,160, filed on Apr. 7, 2014, now Pat. No. 9,621,690.

(60) Provisional application No. 61/947,889, filed on Mar. 4, 2014.

(51) Int. Cl.
*H04M 1/02* (2006.01)

(52) U.S. Cl.
CPC ...... *H04M 1/0279* (2013.01); *H04M 2250/22* (2013.01)

(58) Field of Classification Search
None
See application file for complete search history.

(56) References Cited

U.S. PATENT DOCUMENTS

| | | |
|---|---|---|
| D175,073 S | 7/1955 | Heller |
| D221,720 S | 8/1971 | Hoskins |
| D244,209 S | 5/1977 | Bliven |
| D270,061 S | 8/1983 | Ackeret |
| D274,674 S | 7/1984 | Allen |
| D279,673 S | 7/1985 | Rivette et al. |
| D316,409 S | 4/1991 | Sharbaugh |
| D316,410 S | 4/1991 | Watanabe et al. |
| D319,059 S | 8/1991 | Divine |
| D352,936 S | 11/1994 | Karlin |
| 5,371,790 A | 12/1994 | Nevo et al. |
| D357,256 S | 4/1995 | Jardine |
| D357,918 S | 5/1995 | Doria |
| D358,177 S | 5/1995 | Imai |

(Continued)

FOREIGN PATENT DOCUMENTS

EP    1 096 759 A1    5/2001

OTHER PUBLICATIONS

"Meet the toughest, most durable rugged smartphones money can buy", Jan. 24, 2014, www.phonearea.com.

(Continued)

*Primary Examiner* — Raymond Dean
(74) *Attorney, Agent, or Firm* — Knobbe, Martens, Olson & Bear, LLP

(57) ABSTRACT

Disclosed is a housing for a portable handheld electronic device such as a cellphone. The device has a housing, having a left side and right side. At least one of the left side and right side is provided with integral surface features or surface structures to enhance gripping the cellphone, preferably along the entire length of the phone or within about the top half or one third of the phone.

25 Claims, 11 Drawing Sheets

(56) References Cited

U.S. PATENT DOCUMENTS

| | | | |
|---|---|---|---|
| D375,950 S | 11/1996 | Jones et al. | |
| D380,449 S | 7/1997 | Palatov | |
| 5,805,256 A | 9/1998 | Miller | |
| D407,396 S | 3/1999 | Ogasawara | |
| 5,925,873 A | 7/1999 | Kumar | |
| D418,132 S | 12/1999 | Zoiss et al. | |
| D427,172 S | 6/2000 | Bequir | |
| D427,983 S | 7/2000 | Nagano et al. | |
| 6,164,853 A | 12/2000 | Foote | |
| D459,712 S | 7/2002 | Langford | |
| D460,059 S | 7/2002 | Chan | |
| D480,375 S | 10/2003 | Cebe et al. | |
| D487,440 S | 3/2004 | Langford | |
| D487,442 S | 3/2004 | Wang | |
| D503,708 S | 4/2005 | Kolinen | |
| 6,925,315 B2 | 8/2005 | Langford | |
| D511,773 S | 11/2005 | Horiki et al. | |
| D515,079 S | 2/2006 | Lodato et al. | |
| D524,281 S | 7/2006 | Franck et al. | |
| D528,110 S | 9/2006 | Cohn | |
| D529,466 S | 10/2006 | Rose et al. | |
| D535,636 S | 1/2007 | Cooper | |
| D537,814 S | 3/2007 | Okada | |
| D578,718 S | 10/2008 | Bettanin | |
| D587,416 S | 2/2009 | Ashe | |
| D591,018 S | 4/2009 | Bogaerts | |
| D602,665 S | 10/2009 | Porcini | |
| D606,527 S | 12/2009 | Chen | |
| D612,823 S | 3/2010 | Mazzeo | |
| D615,973 S | 5/2010 | Sip et al. | |
| D616,851 S | 6/2010 | Roka | |
| D624,601 S | 9/2010 | Grossman | |
| D635,971 S | 4/2011 | Sip et al. | |
| D639,260 S | 6/2011 | Armaly | |
| D641,735 S | 7/2011 | Santa Maria et al. | |
| D657,514 S | 4/2012 | Pedriza | |
| 8,153,270 B2 | 4/2012 | Akieda | |
| 8,155,692 B1 | 4/2012 | Roka | |
| D660,295 S | 5/2012 | Mak | |
| 8,180,411 B2 | 5/2012 | Skagmo | |
| D662,925 S | 7/2012 | Mayberry et al. | |
| D663,724 S | 7/2012 | Lee et al. | |
| D667,187 S | 9/2012 | Sowinski | |
| D671,931 S | 12/2012 | Fathollahi | |
| D688,233 S | 8/2013 | Dong | |
| 8,593,745 B2 | 11/2013 | O'Neill | |
| D695,478 S | 12/2013 | Hobe | |
| 8,671,498 B2 | 3/2014 | Ferlito | |
| D740,281 S | 10/2015 | Kim | |
| 9,288,295 B2 | 3/2016 | Ivanovski | |
| D763,250 S | 8/2016 | Jannard | |
| 9,583,285 B1 | 2/2017 | Andre | |
| 9,621,690 B2 * | 4/2017 | Jannard | H04M 1/0202 |
| 2001/0024945 A1 | 9/2001 | Inomata et al. | |
| 2003/0083020 A1 | 5/2003 | Langford | |
| 2005/0141199 A1 | 6/2005 | Chiou | |
| 2006/0083913 A1 | 4/2006 | Armaly | |
| 2009/0251423 A1 | 10/2009 | Jung | |
| 2009/0270135 A1 | 10/2009 | Shoji et al. | |
| 2009/0291709 A1 | 11/2009 | Lee | |
| 2011/0115679 A1 | 5/2011 | Kong | |
| 2011/0309728 A1 | 11/2011 | Diebel | |
| 2012/0093494 A1 | 4/2012 | Wang | |
| 2014/0098509 A1 | 4/2014 | Tomoe | |
| 2014/0128132 A1 | 5/2014 | Cox | |
| 2016/0044148 A1 | 2/2016 | Pizzo | |

OTHER PUBLICATIONS

International Search Report and Written Opinion for PCT/US2015/018125, dated Jul. 1, 2015.

Amazon.com product listing, obtained online Jun. 4, 2014.

"V-Mount NiMH Battery Range," Cine Power International Ltd., Magnolia Lake, Mamhead, NR. Exeter Devon, EX6 8HG, United Kingdom.

* cited by examiner

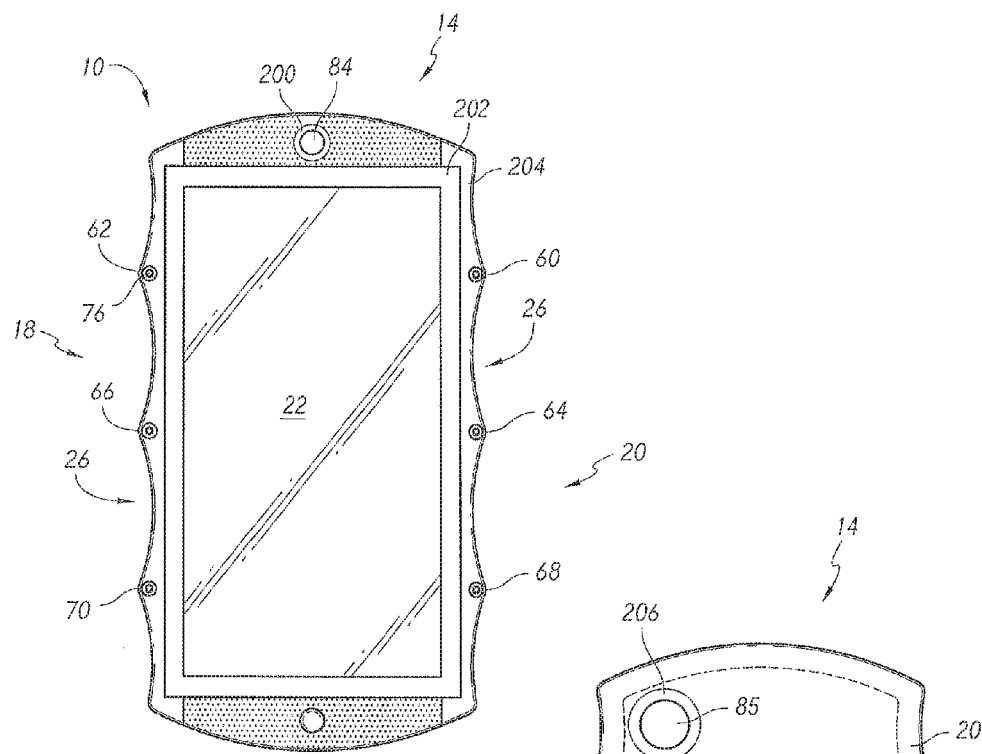
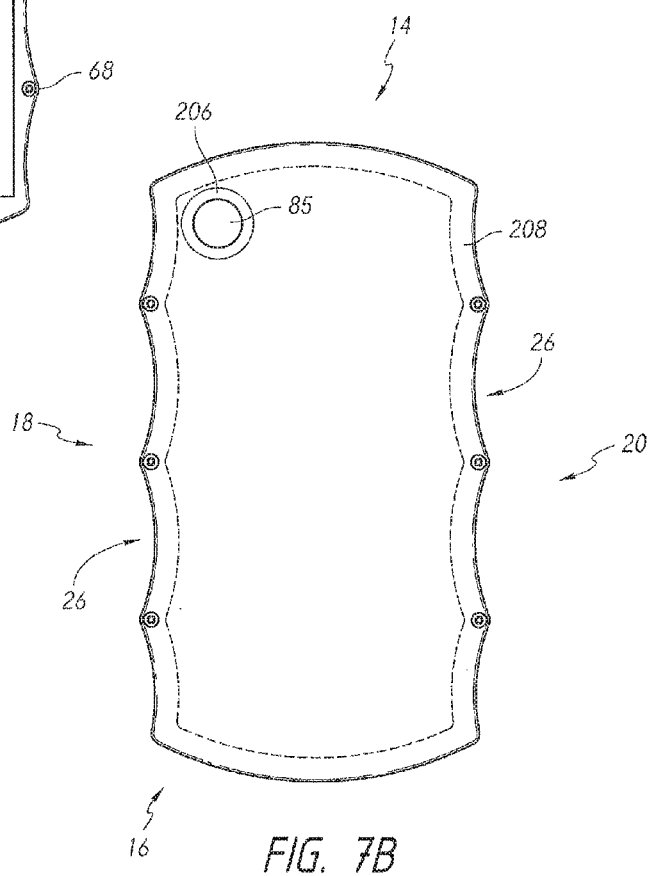
FIG. 7A
FIG. 7B

CELLPHONE WITH CONTOURED
SURFACES

INCORPORATION BY REFERENCE TO ANY
PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Cellphones have increased in capability and have now evolved into so-called smartphones. These mobile phones are built on a mobile computing platform, with more advanced computing ability and connectivity than a typical cellular phone. The first smartphones were devices that mainly combined the functions of a personal digital assistant (PDA) and a mobile phone or camera. Modern models also incorporate the functions of portable media players, digital still and video GPS navigation units and additional electronic capabilities.

Today's smartphones typically also include high-resolution touchscreens, web browsers that can access and properly display standard web pages, and high-speed data access via Wi-Fi and mobile broadband links. Application programming interfaces (APIs) on smartphones allow third-party applications to better integrate with the phone's operating system and hardware, while cellphones more commonly run on proprietary firmware. A variety of operating systems power conventional smartphones, including Android™, iOS™, and Windows® Phone (Android™ is a trademark of Google Inc., iOS™ is a trademark of Cisco Systems used under license by Apple Inc., and Windows® is a trademark of Microsoft Corporation). The confluence of consumer electronic devices and capabilities continues.

Despite the significant advances in hand held electronic devices, the physical form of these devices has seen little evolution. Most are shaped like a more or less smooth brick with increasingly smooth front, back and side surfaces. This configuration can easily slip from the hand of the user, and risk damaging the phone with potential loss of valuable data as well as hardware. Some aftermarket removable covers have been proposed, but such covers add bulk and weight and otherwise fail to provide an elegant solution.

SUMMARY OF THE INVENTION

Some of the inventions disclosed herein provide a housing for a handheld mobile electronic device such as a cellphone, having a modified surface with ridges or contours to enhance traction and resist slipping of the housing in a user's hand.

In accordance with one aspect of at least one of inventions disclosed herein, there is provided a cellphone having enhanced grip surface structures. The cellphone includes a body, having a left side, a right side, a front surface with a display and a rear surface. At least one of the right side and left side is provided with enhanced gripped surface structures comprising at least two laterally projecting extensions defining a concavity therebetween.

Enhanced grip surface structures may be provided on both the left side and right side of the body. At least two concavities may be provided on each of the left side and right side of the body. In some implementations of the invention, the projections are integrally attached to the cellphone body. A first number of concavities may be provided on the left side, and a second, different number of concavities may be provided on the right side.

At least one concavity has a depth of at least about 2 mm, and a width of at least about 0.5 inches.

In some implementations, at least one concavity defines an inwardly extending contour on the rear surface but not on the front surface. Further, in some implementations, the inwardly extending contour extends on the rear surface and on one of the right and left sides, but not on the front surface.

There is provided in accordance with another aspect of at least one of the inventions disclosed herein, a method of manufacturing a cellphone housing. The method comprises the steps of manufacturing a housing having a left side, a right side, and front facing and rear facing surfaces. At least one of the left side and right side include at least two laterally extending projections defining a concavity therebetween, such that the at least two laterally extending projections defining the concavity therebetween remain exposed on the lateral sides of the cellphone following final assembly of the cellphone to provide a cellphone with enhanced grip surface structures.

The enhanced grip surface structures may be provided on both the left side and the right side of the body, and may comprise at least two concavities on each of the left side and right side of the body.

The projections may be manufactured by a machining process, a molding process, or by stamping, coining, bending, or other deformation process. Alternatively, the projections may be provided as a separate component, and mounted on the housing.

Another aspect of a least one of the inventions disclosed herein includes the realization that power requirements for photographic lighting has dropped sufficiently in recent years, due in part to the widespread availability of small and low-power LED lights, that better lighting solutions can be applied to personal electronic devices, such as smartphones or cellphones. For example, those in the art of recognized that the low-power photographic lighting solutions, commonly referred to as a "camera flash", typically included on smartphones and cell phones, do not provide photographically optimal lighting for all photographic applications. For example, the typical, single point of light type flash device on presently available cellphones can create high contrast shadows with sharp edges that can be undesirable for some applications.

Thus, in accordance with some embodiments, a handheld mobile electronic device such as a cellphone can include a photographic lighting device, integrated there with, wherein the photographic lighting device includes at least a plurality of light sources relative to a camera lens of the cell phone. For example, in some embodiments, the lighting device can extend around a periphery of the camera lens. Optionally, in some embodiments, the lighting device can extend around the periphery of another portion of the handheld electronic device, adjacent to the camera lens. The lighting device can be powered directly by the power source used for powering the handheld electronic device. As such, the cell phone can benefit from enhanced photographic lighting without the need for additional power supplies for powering the lights.

In accordance with additional aspects, a cellphone with enhanced grip surface structures comprises a body having a left side, a right side, a top, a bottom, a front surface with a display and a rear surface. The right side and left side are provided with enhanced grip surface structures comprising at least two extensions projecting to the left and at least two extensions projecting to the right defining a left facing concavity and a right facing concavity. The concavities have a best fit radius of curvature within the range of from about 1.0 to about 2.0 inches, and are positioned within the top half of the phone.

At least two concavities can be provided on each of the left and right sides. The at least two concavities on each of the left and right sides can be symmetrically spaced along the length of the phone. The projections in some implementations are integral parts of the cell phone body. Smooth outer side walls can be provided along the bottom half of the phone. The concavities can have a depth of at least about 0.0625 inches. The concavities can have a width of at least about 1.0 inches.

Further features and advantages of the present invention will become apparent from the detailed description of preferred embodiments which follows when considered together the attached drawings and claims.

BRIEF DESCRIPTION OF THE DRAWINGS

FIGS. 7A-7E are schematic views of alternate housing profiles in accordance with embodiments.

DETAILED DESCRIPTION OF THE PREFERRED EMBODIMENT

Figure 1:
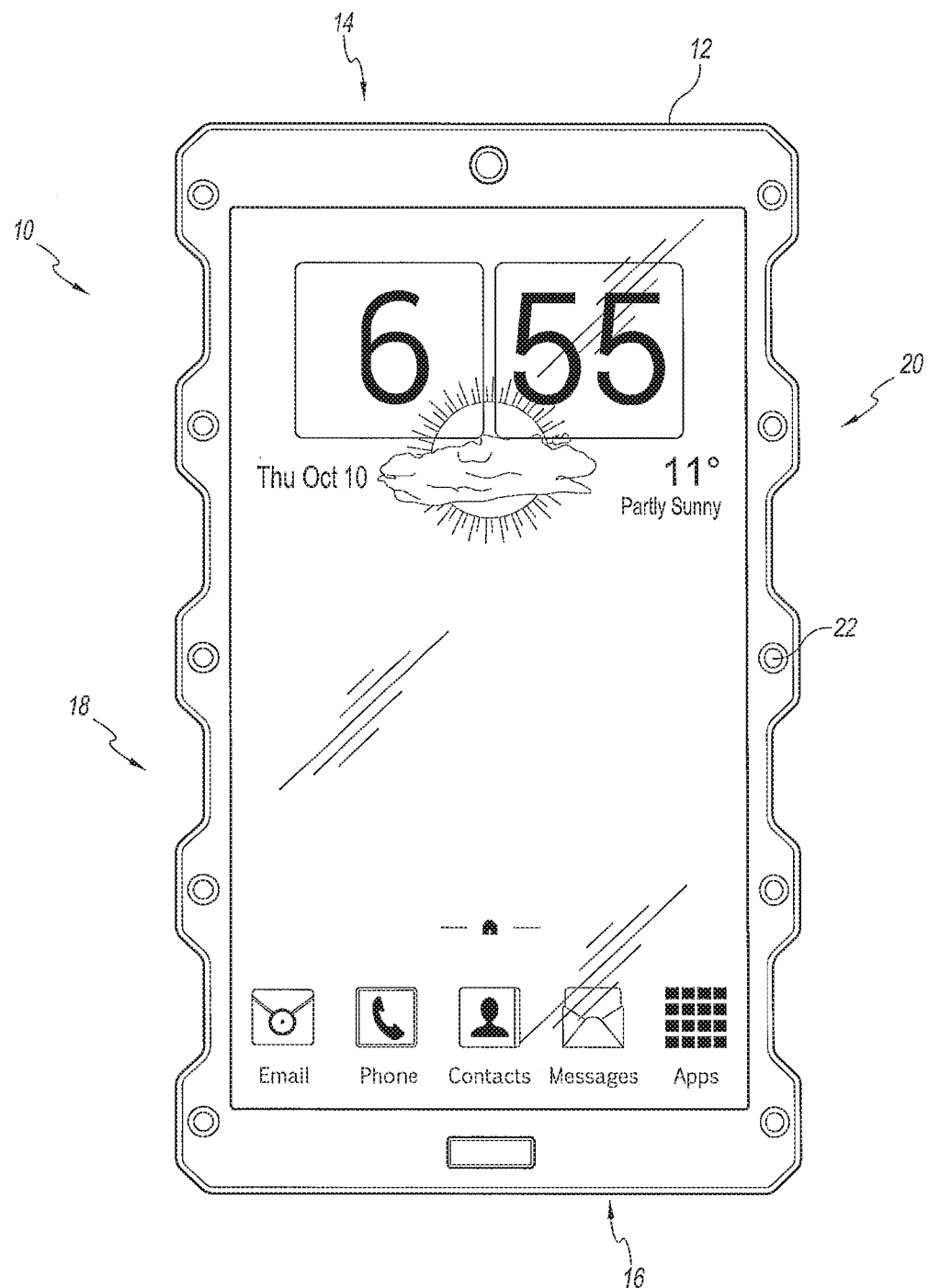
FIG. 1 is a front elevational view of a hand-held cellphone in accordance with one embodiment.

Referring to FIG. 1, there is illustrated a hand-held electronic device such as a cellphone 10. Although described herein primarily in the context of a cellphone, the inventions herein are applicable to any of a variety of handheld electronic devices with or without cellphone functionality, including digital still and motion cameras, personal navigation devices, mobile internet devices, handheld game consoles, or devices having any or a combination of the functions discussed in connection with FIG. 8, below.

The cellphone can include a housing 12, having a top edge 14 and a bottom edge 16. Viewing the phone in its normal use orientation, cellphone 10 includes a left side 18, a right side 20 and a display 22. Display 22 displays a variety of applications, functions and information as is understood in the art. Display 22 may also incorporate touch screen control features as is understood in the art.

Dimensions of the housing 12 can vary considerably, depending upon the manufacturer and functionality of the phone. For example, the HTC smart phone is approximately 104 mm high by 55 mm wide by 12.8 mm thick. The Samsung Galaxy S5 is about 142 mm in height, 72.5 mm wide and 8.1 mm thick. The LG G2 is about 138.5 mm high, by 70.9 mm wide by 8.9 mm thick. The Apple iPhone S5 is approximately 123.8 mm high by 58.6 mm wide by 7.6 mm thick. Cell phones incorporating any of the inventions disclosed herein may fall within the range of the minimum to maximum recited above, or above or below that range, as desired. In all of the foregoing commercial products, the left side 18 and right side 20 are essentially perfectly linear. In contrast, at least one of the left side 18 and right side 20 of the cellphone in accordance with an aspect of at least one of the inventions disclosed herein are provided with regular, undulating contoured surfaces to facilitate grip.

The contoured surfaces or edges can comprise interference fit or friction enhancing surface structures or configurations to facilitate gripping the device with reduced chance of slipping and dropping. They can be provided in a variety of forms including some discussed below. In general, the surface structures are preferably permanently attached to the cell phone housing, as distinct from removable cell phone protective cases such as are available in the aftermarket. The enhanced gripping surface can be integrally formed with the housing, such as by machining, injection molding or other operations. The surface may alternatively be applied at the point of manufacture or assembly, such as by overmolding, adhesively bonding or attaching by any of a variety of techniques such as with screws or other fasteners, or by soldering, welding, brazing, press fit interference interlocking structures or other attachment technique known in the art. The enhanced gripping surface is preferably not removable by the user in the course of ordinary intended use, and removal by the consumer would require destructive acts or would void the warranty of the device. The contoured surfaces are thus, in some embodiments, preferably a part of the native housing of the cell phone or other hand held electronic device.

The terms concavity and projection as used herein are convenience terms to refer to deviations from planar in a lateral direction such that a laterally outwardly facing concavity is defined between two projections extending laterally in the same direction to define the sides of the concavity. The terms concavity and projection are thus used in a relative spatial sense and do not convey the manner in which they were formed unless otherwise specified. In general, a projection to the right may be formed by adding material to the native right side surface of a substrate, or by removing material from the native right side surface of the substrate on either side of a region which has now become a projection, or by indenting a left side of a substrate to form a corresponding right facing projection, or by bending a substrate such as into a zigzag configuration to produce a plurality of laterally facing projections and concavities.

The laterally extending structures may thus be projections in a conventional sense formed such as by the addition or attachment of projections to a starting surface to build it out, but also include two native portions of a starting component between which a recess or indentation has been formed thereby resulting in the native surface forming a relative projection as a result of the recesses on either side. Thus any of a variety of manufacturing techniques may be utilized to provide the projections and recesses of the non-smooth lateral sides of the cell phone body in accordance with one or more aspects of the inventions disclosed herein, depending upon the materials and desired manufacturing techniques. The projections may be formed by injection molding or other molding techniques, particularly in the case of a polymeric housing. Projections may be formed by stamping, coining, or other compression or bending steps to provide an impression on a first side of a substrate and a corresponding projection on the opposing side of the substrate. The substrate in this instance may be in the form of a strip (e.g., stainless steel, titanium, aluminum or other metal) of material that will subsequently be attached to a frame to form the lateral surfaces of the housing. Projections may alternatively be formed by attachment of a separate component to a substrate, such as by adhesively bonding, soldering, brazing, welding or other bonding technique, or by mechanical interfit such as interference fit structures or through the use of fasteners such as screws, rivets or press fit constructs. Projections (and the corresponding intervening concavities) may alternatively be formed by removal of material from a substrate to form the concavity such as by grinding, milling, EDM, laser etching or other machining or removal technique as will be understood by those of skill in the art in view of the disclosure herein.

Figure 2:
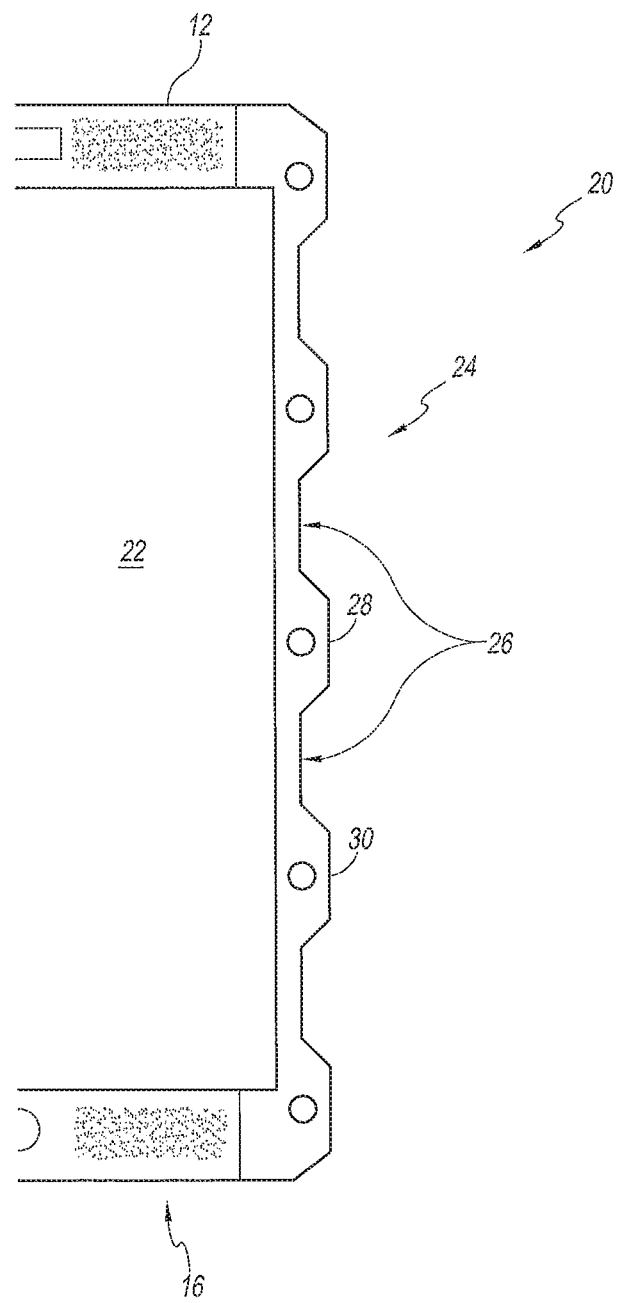
FIG. 2 is an enlarged schematic view of a right edge of the cellphone of FIG. 1.

Referring to FIG. 2, there is illustrated a schematic enlargement of the right side 20 of the cellphone housing 12. The left side may or may not be a mirror image of the right side. Right side 20 is provided with a contoured wall 24 having at least one concavity 26 positioned between a first projection 28 and a second projection 30. At least one concavity 26, and generally at least about 2, 3, 4, 5 or more may be provided on right side 20. In the embodiment illustrated in FIG. 1, four concavities 26 are illustrated.

Figure 3:
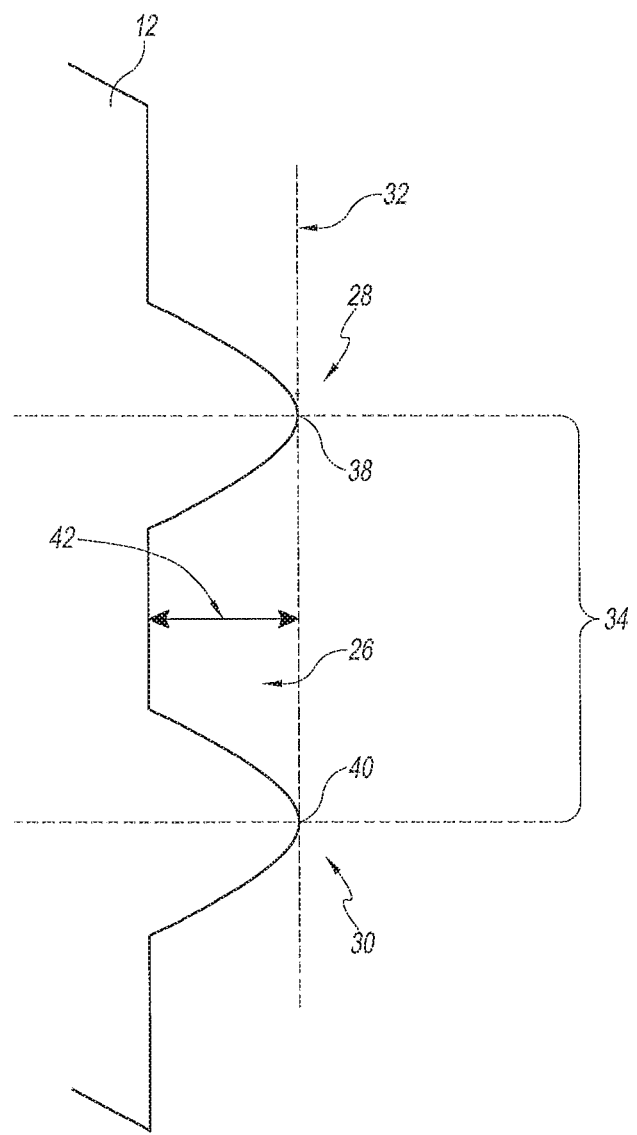
FIG. 3 is an enlarged schematic view of a single concavity of a cellphone housing in accordance with embodiments.

Additional details of a single concavity 26 may be seen in connection with FIG. 3. An outer boundary 32 is an imaginary line which contacts the apex of each of first projection 28 and second projection 30. In an embodiment where the projections comprise curved surfaces, the outer boundary 32 would describe a tangent with respect to the first projection 28 and second projection 30. The width 34 of the concavity 26 may be measured between the tangent contact point 38 and 40 in the implementation illustrated in FIG. 3. In an embodiment in which the projection has a flat surface, such as that illustrated in FIG. 1, the width 34 of the concavity will be measured between the points at which the wall of the concavity fall away from the outer boundary 32 in the direction of the center of the concavity.

The concavity may also be considered to have a depth 42, measured between the outer boundary 32 and the deepest point in the concavity 26.

The width 34 of the concavity will generally be at least about 2%, often at least about 4% or 6% and in some embodiments as much as 10% or more of the overall height of the housing 12 measured along the direction of outer boundary line 32. In some implementations, the width 34 may be at least about 30%, and in some implementations, at least about 50% of the height of the housing 12, depending upon the desired performance. In general, the width 34 of each concavity 26 will be at least about 0.25 inches, and often at least about 0.5 inches.

The depth 42 of the concavity 26, measured at its deepest point, will typically be in excess of about 1 mm, and often at least about 2 mm or 3 mm or more. In some embodiments, the depth 42 will be about 4 or 5 mm, or more.

Figure 4:
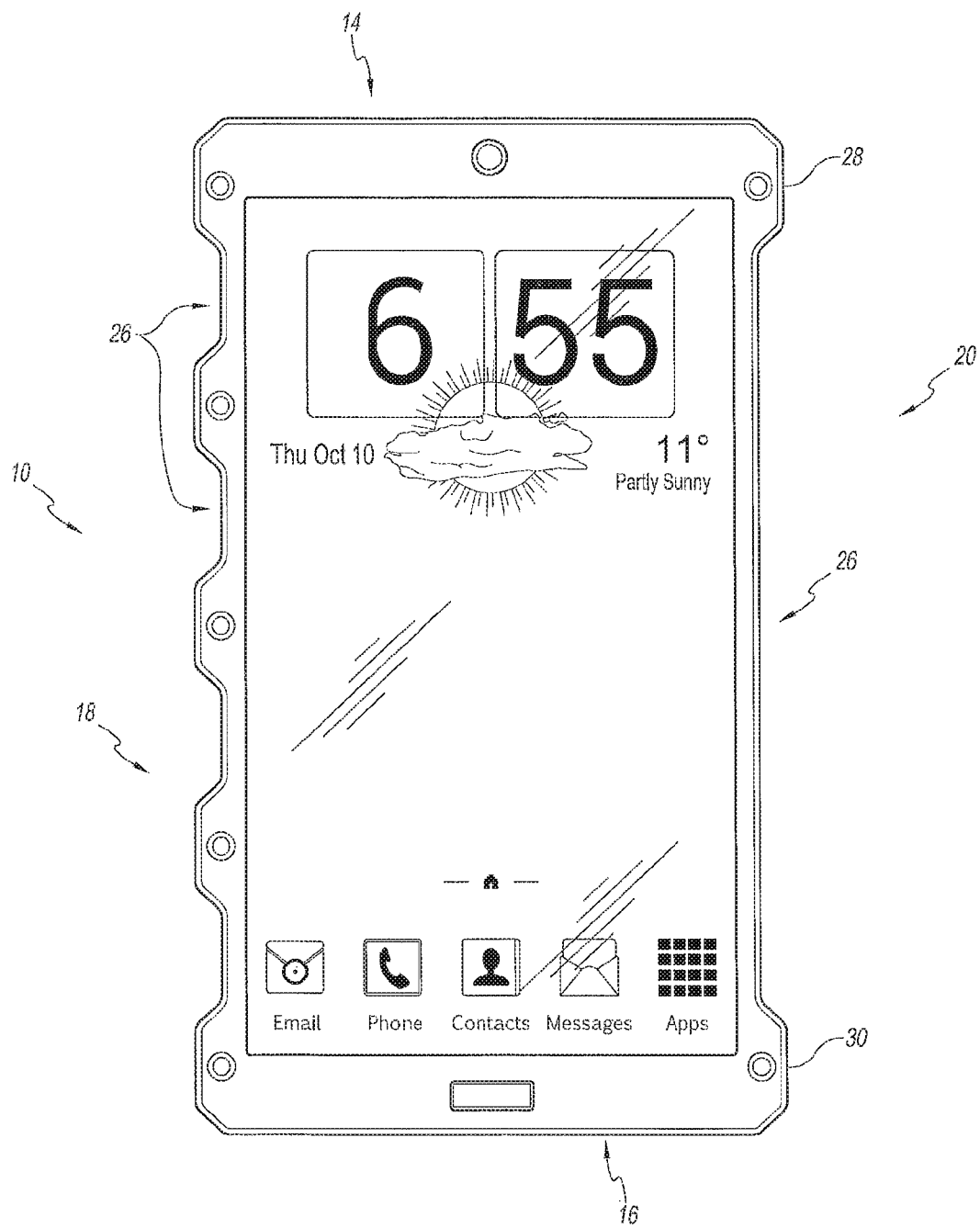
FIG. 4 is a front elevational view of a handheld cellphone as in FIG. 1, reconfigured with bilateral asymmetry for right hand operation.

The cellphone housing illustrated in FIG. 1 exhibits bilateral symmetry. However, asymmetrical configurations may be desirable as described below. Referring to FIG. 4, there is illustrated a cellphone housing as in FIG. 1 with a left side 18 and a right side 20. However, the left and right sides exhibit bilateral asymmetry by having fewer concavities 26 on the right side than are present on the left side 18. Mirror images of any of the asymmetrical configurations disclosed herein are also contemplated.

In the illustrated embodiment, a single right side concavity 26 is defined between a first projection 28 and a second projection 30. The single concavity 26 has a width 34 of at least about 30%, and in some implementations at least about 50%, at least about 75% or 85% or more of the overall height of the phone. This configuration might be considered to be a phone optimized for right hand operation. As is understood in the art, the anatomy of the hand includes a large rounded mound at the base of the thumb, known as the thenar eminence. This is the result of a grouping of muscles dominated by the abductor pollicis bruvis. Providing a concavity 26 having a width of at least about 1 inch, and in some embodiments at least about 1½ inches or 2 inches or 2½ inches or more, provides a cradle for the thenar eminence whereas the multiple distinct concavities 26 on the left side 18 of the housing provide individual cradles for individual fingers. Although the concavity 26 is illustrated in FIG. 4 as bilaterally symmetrical about the mid-point of the height of the phone housing, the mid-point of the concavity 26 may be offset in an inferior direction, closer to the bottom edge 16 than the top edge 14. In this manner, the housing for the cellphone may more closely conform to the hand of the user, and the form factor of cellphones in accordance with one or more aspects of at least one of the inventions disclosed herein may take the form of a contoured grip that may be securely grasped by the user.

Figure 5:
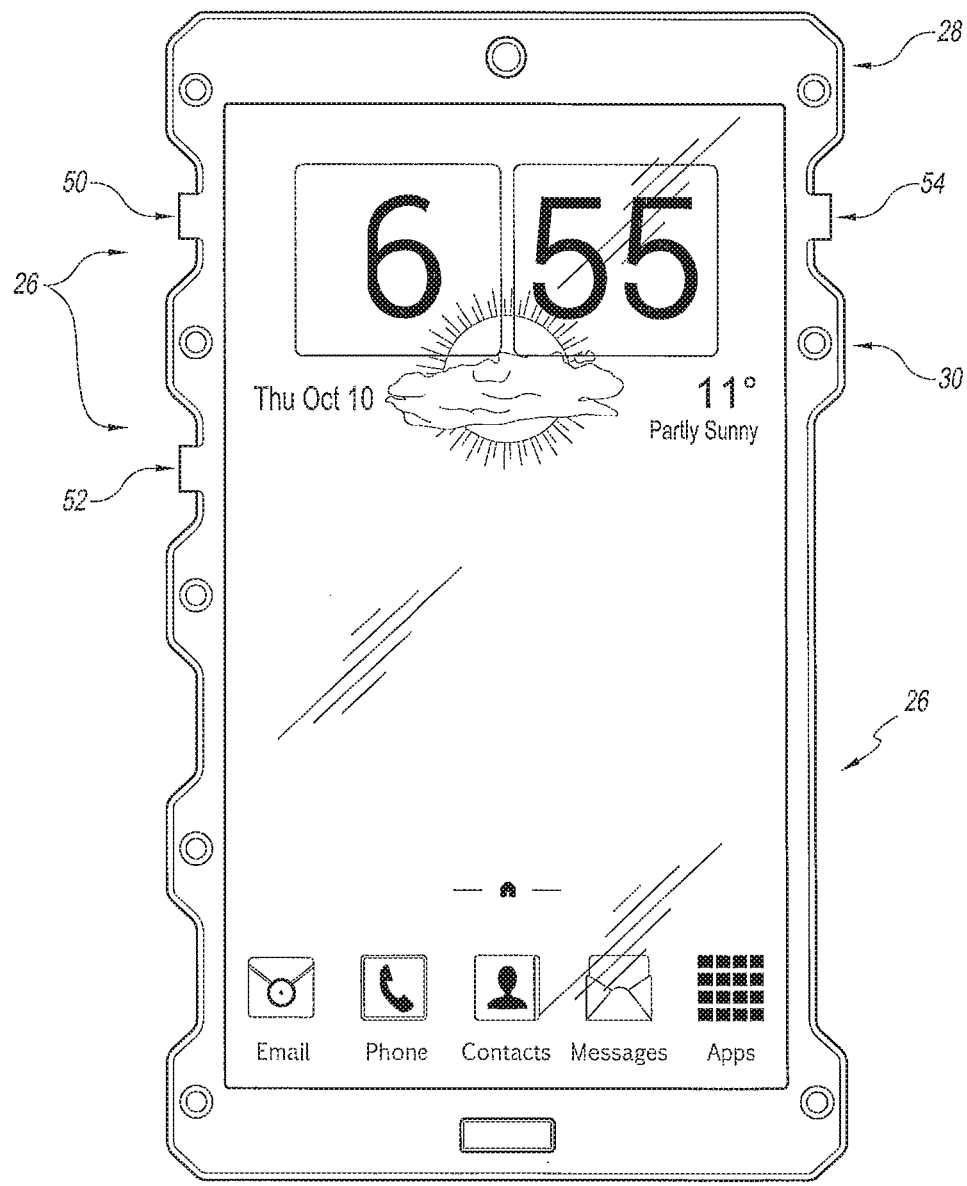
FIG. 5 is a front elevational view as in FIG. 4, with electronic controls positioned in selected concavities.

Referring to FIG. 5, it will be appreciated that embodiments of the concavities of the cellphone housing can provide a predictable landing point for each of the fingers when a user is grasping the cellphone. Thus, finger buttons to control various functions of the phone may be located within one or more of the concavities 26. Buttons or other controls may be provided with an activation force threshold that is high enough that the cellphone may be grasped by the user under normal use conditions without activating the button. However, upon application of a greater compressive force than normally utilized to grasp the phone, the user can selectively activate the buttons as desired, to control various functions of the telephone.

Thus, referring to FIG. 5, a first concavity 26 may be provided with a user activated control such as a button 50, for activation by the index finger. In this instance, the illustrated cellphone is configured for operation by the user's right hand. A second concavity 26 may be provided with a second control 52 for activation by the user's middle finger. Additional buttons (not illustrated) may be provided for the user's ring finger, and baby finger.

In addition, a concavity 26 on the right side of the phone may be provided with a button or other control 54 for activation by the user's thumb. The thumb control 54 may be positioned within a concavity 26 defined between a first projection 28 and a second projection 30 that are less than about 2 inches, and preferable less than about 1 inch apart. A larger concavity 26 is provided as previously described to provide a cradle for the thenar eminence.

Figure 6:
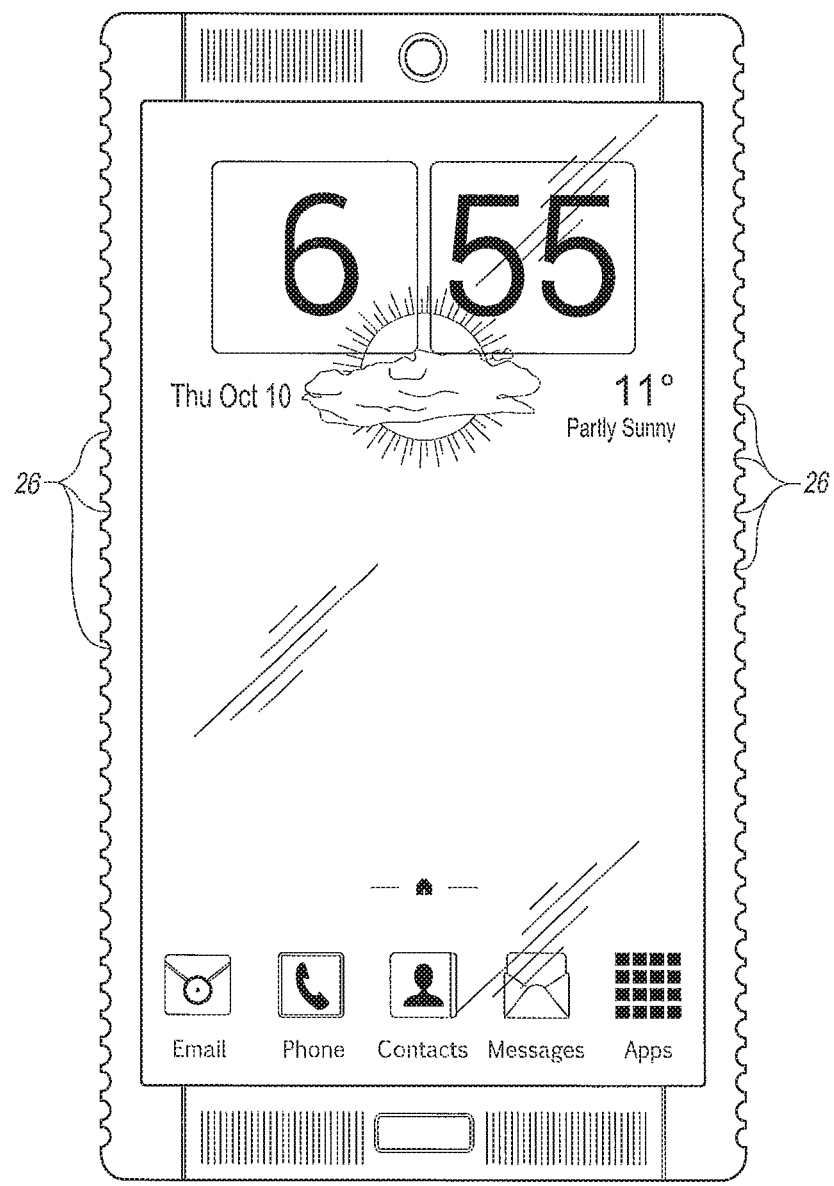
FIG. 6 is a front elevational view of an alternate handheld cellphone in accordance with embodiments having gripping surfaces with small contours.

Embodiments of the concavities 26 of relatively short width may begin to appear to have a corrugated or ridged surface, such as illustrated in FIG. 6. In this implementation, there may be at least about 5, at least about 10, and in some implementations at least about 15 or more concavities 26 per running inch of width along the side walls of the phone. An additional example of housing profile is illustrated in FIG. 7A, showing a plurality of concavities having substantially constant radius of curvature.

Referring to FIGS. 7A and 7B, there is illustrated a hand held device such as a cellular phone having a top edge 14, a bottom edge 16, a left side 18 and a right side 20. Each of the left side 18 and right side 20 are provided with a plurality of substantially uniform concavities or undulations, as will be discussed in greater detail. The illustrated embodiment exhibits bilateral symmetry, with a first left projection 62 disposed opposite a first right projection 60. Together, projection 62 and projection 60 define an opposing projection pair, oriented on a line which is transverse to the longitudinal axis of the phone. Preferably, the first projection pair is located on the top half of the phone, and generally will be within the top ⅓ or top 25% of the overall height of the phone.

A second right projection 64 may be provided, opposite a second left projection 66. Together, right projections 60 and 64 define the limits of a concavity 26 extending therebetween. Second right projection 64 and second left projection 66 together form a second projection pair, which in turn define a left and right concavity 26 positioned within the top half of the phone. Second right projection 64 and second left projection 66 may define a line which is transverse to the longitudinal axis of the phone, and which may cross the longitudinal axis of the phone at a point within the range of from about ±30%, in some embodiments within the range of from about ±15%, and, in some embodiments within about ±5% of the overall length of the phone from the longitudinal midpoint of the phone.

In the illustrated embodiment, a third right projection 68 is disposed opposite a third left projection 70, to define a second pair of concavities 26. A fourth right and fourth left projection, and a fifth right and fifth left projection may be provided depending upon the desired functionality of the phone.

In the illustrated embodiment, the projection pairs are spaced symmetrically about the longitudinal centerline of the phone. In an embodiment having a longitudinal length of about 6.25 inches, the second right projection 64 and second left projection 66 lie on a line which crosses the midpoint of the phone at approximately 3.125 inches from the top edge 14 or lower edge 16. In this embodiment, each concavity 26 has a substantially constant radius of curvature, which is generally within the range of from about 0.5 inches to about 2.5 inches, often within the range of about 1.0 inches to about 2.0 inches, and, in one implementation, the radius is within the range of from about 1.3 inches to about 1.8 inches. The curvature of the surface within each concavity 26 may be substantially constant, such that the surface curve conforms substantially to a portion of a surface of a circle. Alternatively, the curvature of the concavity 26 may be noncircular, such as a surface which conforms to a portion of a surface of an ellipse or toroid. As used herein, radius refers to the radius of a constant radius curve, as well as the radius of a constant radius curve which has the best fit with the non-constant radius curvature of the concavity 26.

The arc length measured along the surface of the curve of concavity 26 from the apex of adjacent projections will generally be within the range of from about 0.5 inches to about 2.5 inches, often between about 1.0 inches and 2.0 inches, or within about 1.2 inches and about 1.8 inches.

A line 72 illustrates the width of the phone at the upper edge 14 and lower edge 16, measured in parallel to the longitudinal axis of the phone. Line 74 illustrates the outer most width boundary of the phone, drawn along a tangent from apex to apex of adjacent projections. Concavities 26 may thus represent an area of material which has been removed from the wall of the phone relative to the area of the best fit rectangle surrounding the perimeter of the phone.

The linear distance between reference line 72 and reference line 74 is generally at least about 0.050 inches, often at least about 0.0625 inches, and preferably at least about 0.125 inches.

A first plurality of screws or other fasteners 76 may be provided for connecting front and back plates of the phone together. At least 2 and preferably at least 4 or 6 fasteners 76 may conveniently be positioned along the right and left sides 20 and 18 within the projections, thus enabling the fasteners 76 to be carried "off board" so that the width of the viewing surface of the phone may be maximized relative to the overall mass of the phone.

A second set of fasteners 78 may be provided, with two fasteners located above the viewing screen and two fasteners located below the viewing screen. As such, they may be radially inset towards the midline of the phone without compromising the viewing screen. An upper left speaker 80 and upper right speaker 82 may be provided above the viewing screen, as well as a camera lens 84. A lower left speaker 83 and a lower right speaker 86 may be provided, as well as at least one microphone may be positioned on the phone, such as below the viewing screen.

Figure 7C:
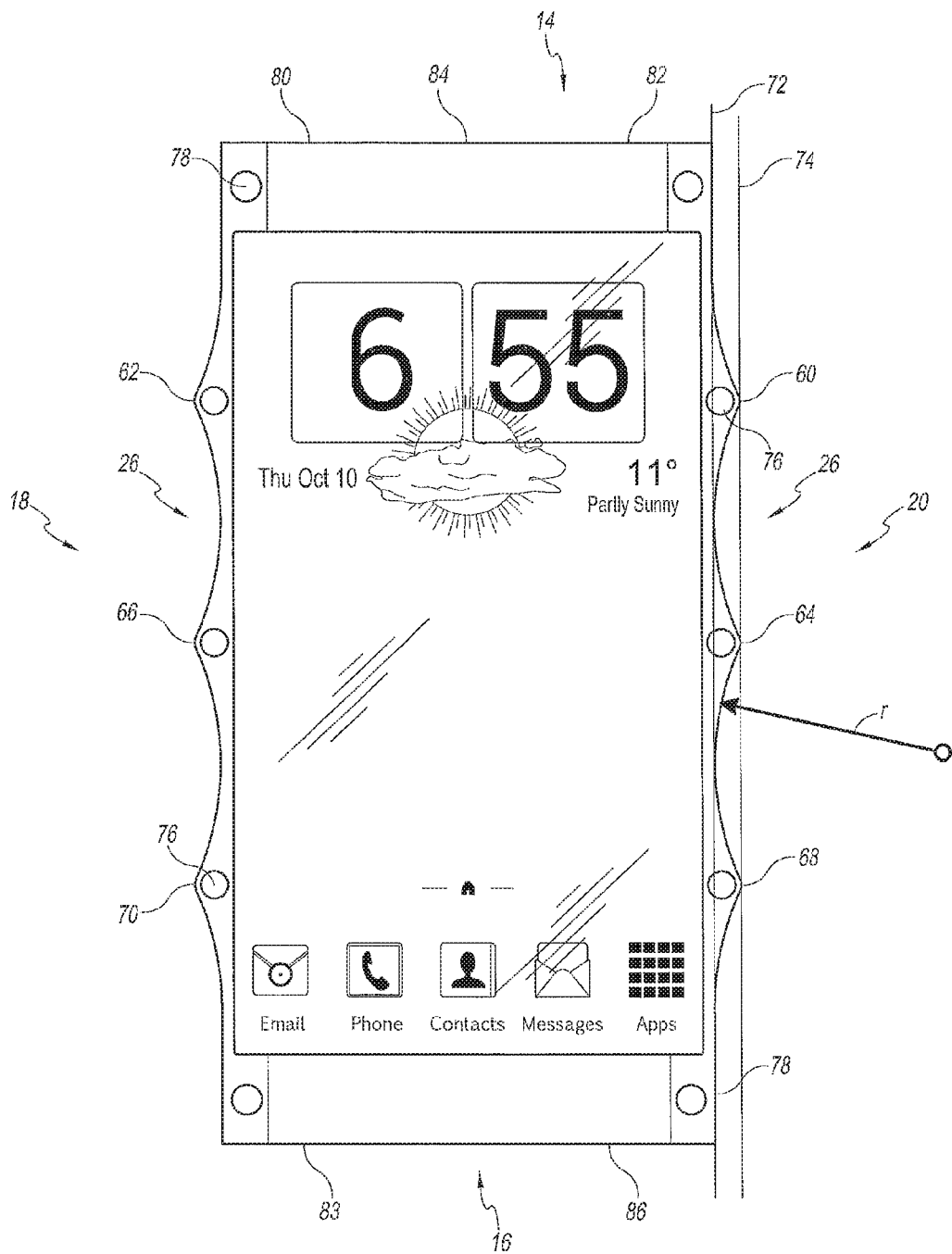
Figure 7D:
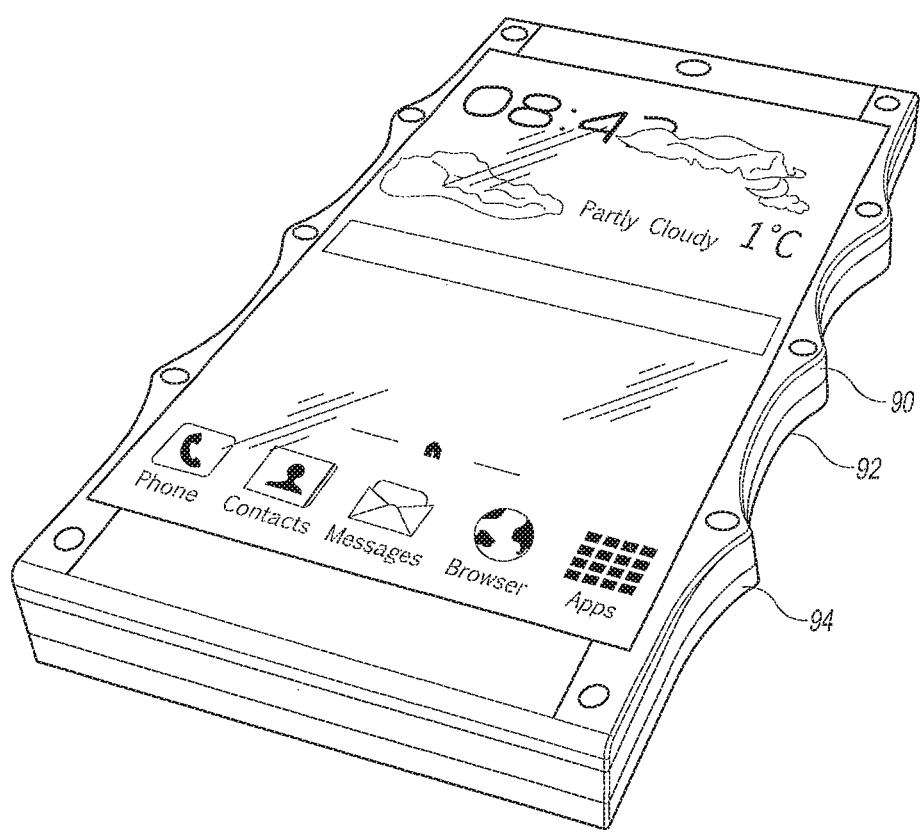

Referring to FIG. 7D, there is illustrated a perspective view of the embodiment shown in FIG. 7C. In the illustrated embodiment, a front plate 90 and a rear plate 92 are spaced apart by an intermediate frame 94 in a sandwich configuration, to enclose the electronics of the phone. A plurality of fasteners secure the front plate 90 and rear plate 92 together, to provide an enclosed electronics chamber.

Preferably, the camera includes a capability for capturing still images with various and/or adjustable resolutions and aspect ratios for example but without limitation, as high as 6144×3160 pixels or higher with aspect ratios such as 2:1, 2.4:1, 16:9, etc., and a capability for capturing motion images at resolutions up to about "6K" or higher including for example, but without limitation, 6K (2:1, 2.4:1), 5K (Full Frame, 2:1, 2.4:1 and Anamorphic 2:1), 4.5K (2.4:1), 4K (16:9, HD, 2:1 and Anamorphic 2:1), 3K (16:9, 2:1 and Anamorphic 2:1), 2K (16:9, 2:1 and Anamorphic 2:1), 1080p RGB (16:9), 720p RGB (16:9) and other resolutions and formats, depending on the size of the image sensor used in the device 10 and the capacity of the supporting electronics. Additionally, the device 10 can be configured to include a number of compression options, including compressed raw mosaic image sensor data, compressed fully rendered video data and uncompressed video data. An onboard memory preferably comprises a capacity of at least about 64 GB, and, in one implementation, at least about 128 GB. The phone includes a slot or cavity for receiving at least one, and preferably two or more SIM cards, to enable the phone to receive two or more phone numbers. Two cameras are provided, one facing outwardly from the front of the phone and one facing outwardly from the rear of the phone.

With continued reference to FIGS. 7A and 7B, the device 10 can include one or more lights which, optionally, can be used for personal lighting (e.g., flashlight) or photographic purposes. For example, as noted above, the device 10 can include a camera lens 84. Optionally, the device 10 can include a lighting device 200 disposed on the front side of the device 10, facing the same direction as the lens 84. The lighting device 200 can be any type of lighting device, and in some embodiments, is configured for high intensity "flash" output such as that used for "flash photography". Additionally, in some embodiments, the lighting device 200 can also be configured for continuous operation, such as in a flashlight mode for providing lighting as desired by user. Similarly, the lighting device 200 can be configured for continuous operation during use of the camera lens 84 for recording motion video. In some embodiments, the lighting device 200 can be in the form of one or plurality of LEDs. The design and operation of this type of lighting device, including those designs based on LEDs, is well known in the art.

Optionally, as illustrated in FIG. 7A, the lighting device 200 can extend around the periphery of the camera lens 84 youth in connection with a first camera 151, described below with reference to FIG. 8. As such, the lighting device 200 can provide an effect similar to that provided by lighting devices known as "ring lights" or "ring flashes". In some embodiments, the lighting device 200 can be constructed using two or more light emitting devices, such as LEDs, and an optical diffuser such as a transparent material with a frosted surface application. Further, the lighting device 200 can include light emitting devices configured to be adjustable as to the color or temperature of light emitted therefrom. For example, the light emitting devices included within the lighting device 200 can be configured to emit different "temperatures" of white light typically used for photography. Additionally, the lighting device 200 can be configured to emit a large range of different colors of light, for example, using "RGB" LEDs light emitting devices. Such LED devices as well as the operation control of which are widely known and commercially available.

In some embodiments, the device 10 can include a lighting device 202. As shown in the illustrated embodiment of FIG. 7A, the lighting device 202 can include a circumferentially extending configuration. For example, the lighting device 202 can extend around the display 22. In a similar fashion or the same fashion as the lighting device 200, the lighting device 202 can be constructed with a plurality of light emitting devices, such as LEDs, which can be white, adjustable within a range of temperatures of white colors, or a broad range of colors such as "RGB" LED lighting devices. Additionally, the lighting device 202 can be configured for control is a "flash" mode for photography, in a flashlight mode, or other modes for continuous or substantially continuous output of light for personal lighting applications such as recording motion video as desired. Additionally, the device 10 can include programming for operating the lighting device 202 for further entertainment purposes, such as light changing schemes which may or may not be synchronized with audio output from the device 10. Such control options and techniques are well known in the art.

As an alternative to or in combination with the lighting devices 200, 202, the device 10 can also include a lighting device 204. As shown in FIG. 7A, the lighting device 204 can be disposed along the peripheral edge of the device 10. In the illustrated embodiment, the lighting device 204 follows along the shape of the outer periphery of the vice 10 and that includes or defines part of the concavities 26. Additionally, similarly to the lighting device 202, the lighting device 204 can include a plurality of light emitting devices, such as LEDs, covered with a translucent cover for diffusing light emitted by the light imaging devices. In other embodiments, as alternatives to or in combination with any of the lighting devices 200, 202, 204, the device 10 can include light imaging devices placed atop one or more of the screws 76 described above.

With reference to FIG. 7B, the backside of the device 10 can include a camera lens 85, for example, for use in conjunction with a second camera 152, described below with reference to FIG. 8. Using a similar or identical construction as the lighting device 200, the device 10 can also include a light lighting device 206 disposed partially or entirely around a periphery of the lens 85. Further, as an alternative to or in combination with the lighting device 206, the device 10 can include a lighting device 208 extending around a periphery of the backside of the device 10. The lighting device 208 can be constructed in a similar or identical fashion to the lighting devices 200, 202, or two of four noted above.

By providing a lighting device with a more diffused light emission characteristics, such as that resulting from the ring-shaped lighting devices 200, 206 or the more rectangular lighting devices 202, 204, 208 or even the use of a plurality of lighting devices disposed at a plurality of points relative to a camera lens, such as the camera lens 84, 85, different lighting aesthetics can be achieved. In some photographic techniques, the use of more diffused lighting can provide enhanced and or more desirable results, for example, by generating shadows with softer edges, and/or other effects.

Figure 7E:
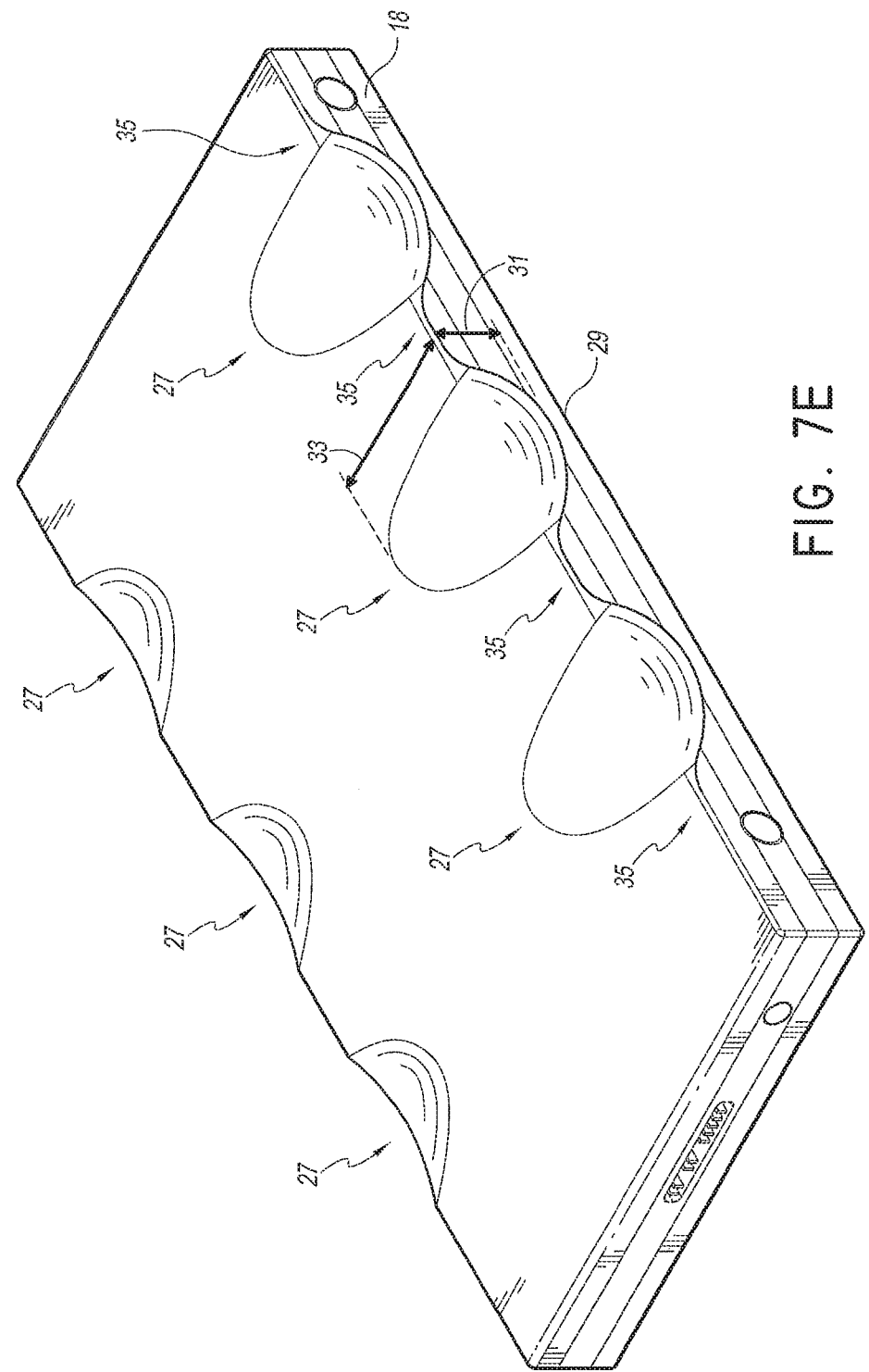

With reference to FIG. 7E, in some embodiments, the device 10 can include concavities 27 which do not extend onto the front side of the device 10. For example, FIG. 7E illustrates an alternative embodiment in which the concavities 26 are in the form of concavities 27 defined in the back surface of the device 10 as well as one or both of the sides 18, 20. FIG. 7E illustrates a plurality of concavities 27 which are defined partly on the backside of the device 10 and on the left side 18. However, an edge 29 between the left side 18 in the front side of the device 10 extends along a generally straight line. That is because, in the illustrated embodiment, the concavities 27 do not extend beyond the edge 29 or onto the front side of the device 10. Thus, the embodiment of the device 10 illustrated in FIG. 7E, would appear to be rectangular in a top plan view, in other words, the concavities 27 would generally not be visible in a top plan view of the front side (the view corresponding to FIG. 7A).

In some embodiments, the concavities 27 can have a maximum depth 31 of approximately 75% of the thickness of the device 10, however, other depths can also be used. Additionally, the concavities 27 can have a length 33 smaller than the magnitude of the depth 31, approximately the same magnitude as the depth 31, or up to 2 to 3 times the magnitude of the depth 31. However, other configurations of the concavities 27 can also be used. In the context of the embodiment of FIG. 7E, the raised areas adjacent to the concavities 27 can be considered as forming projections 35 on the left side 18, defining the concavities 27 therebetween.

Figure 8:
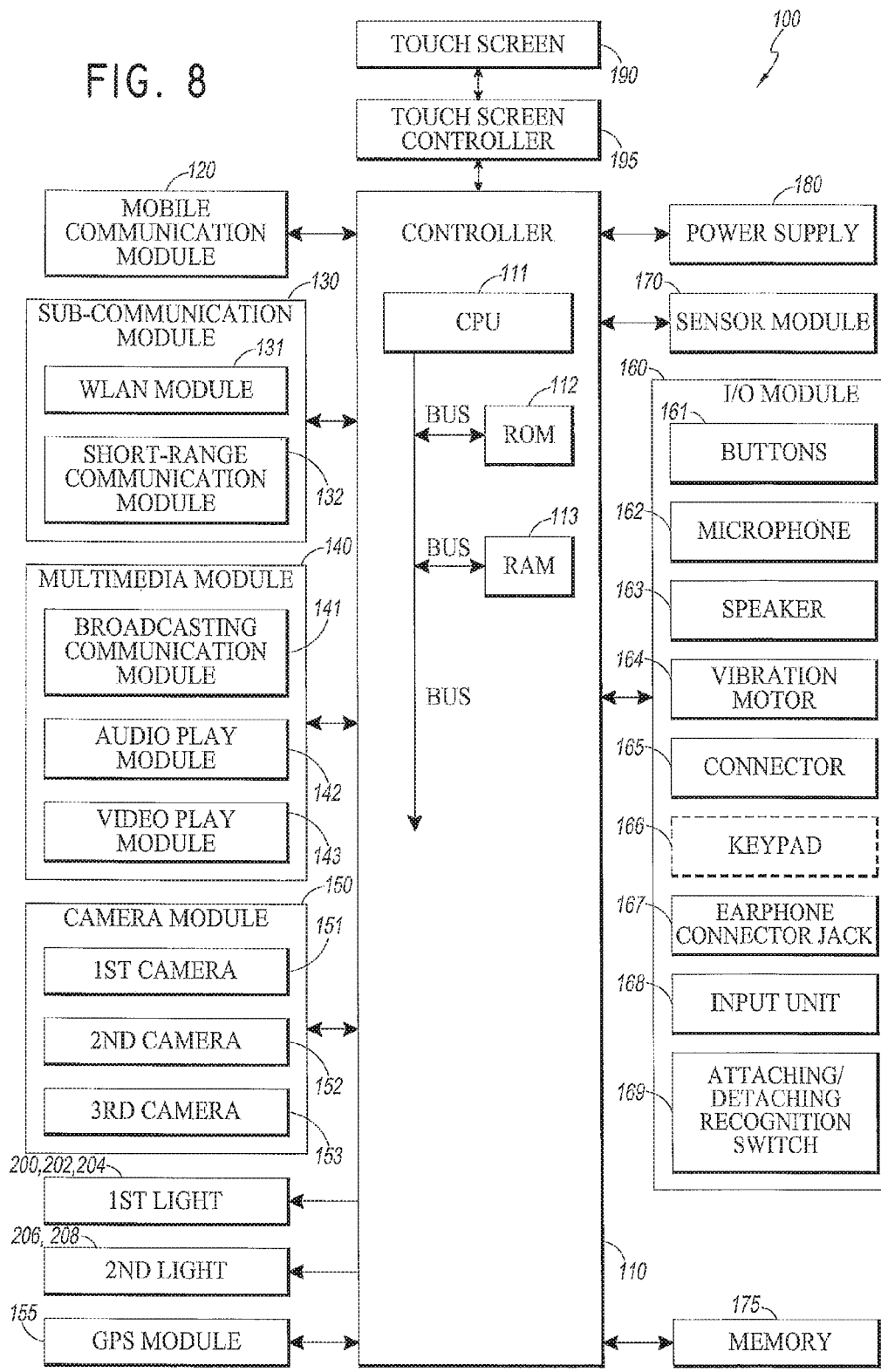
FIG. 8 is a block diagram illustrating various electronic aspects and features of a device in accordance with embodiments.

FIG. 8 is a block diagram illustrating various additional electronic aspects and features of a device according to an embodiment of the present disclosure. The housing of the embodiments described above may be utilized with electronic devices having any of a variety of features, and the following is illustrative only and not limiting on the present inventions. Additional details of potential electronic aspects can be found, for example, in U.S. Patent Publication No. 2014/0055394, published Feb. 27, 2014, the contents of which are incorporated by reference in their entirety herein.

Referring to FIG. 8, an electronic device 100 such as a cellphone in accordance with an embodiment may be connected to an external device by using an external connection device, such as a sub-communication module 130, a connector 165, and an earphone connecting jack 167. The "external device" may include a variety of devices, such as earphones, external speakers, Universal Serial Bus (USB) memories, chargers, cradles/docks, Digital Multimedia Broadcasting (DMB) antennas, electronic payment related devices, health care devices (e.g., blood sugar testers), game consoles, vehicle navigations, and the like, which are removable from the electronic device and connected thereto via a cable. The "external device" may also include a short range communication device that may be wirelessly connected to the electronic device 100 via short range communication, such as BLUETOOTH, a short range wireless communications technology at the 2.4 GHz band, commercially available from the BLUETOOTH SPECIAL INTEREST GROUP, INC., a Near Field Communication (NFC), and the like, and a communication device using WI-FI DIRECT, a wireless technology for data exchange over a computer network, commercially available from the WI-FI ALLIANCE, a wireless Access Point (AP), and the like. Furthermore, the external device may include any other device, such as a cell phone, a smartphone, a tablet PC, a desktop PC, a server, and the like.

Referring to FIG. 8, the electronic device 100 includes a display unit 190 and a display controller 195. The electronic device 100 also includes a controller 110, a mobile communication module 120, the sub-communication module 130, a multimedia module 140, a camera module 150, a Global Positioning System (GPS) module 155, an input/output module 160, a sensor module 170, a storage 175, and a power supply 180. The sub-communication module 130 includes at least one of Wireless Local Area Network (WLAN) 131 and a short-range communication module 132, and the multimedia module 140 includes at least one of a broadcast communication module 141, an audio play module 142, and a video play module 143. The camera module 150 includes at least one of a first camera 151, a second camera 152, a third camera 153 and the input/output module 160 includes at least one of buttons 161, a microphone 162, a speaker 163, a vibration motor 164, the connector 165, and a keypad 166. In some embodiments, the second and third cameras 152, 153 can both be disposed on the backside of the device 10, so to accommodate various types of photographic tools, including 3-D still photography or motion video, as well as other types of effects. Additionally, the electronic device 100 can include one or more lights, for example, the lights 200, 202, 204 described above are schematically illustrated as a "first light". Additionally, the lighting devices 206, 208 are schematically illustrated as a "second light".

The controller 110 may include a Central Processing Unit (CPU) 111, a Read Only Memory (ROM) 112 for storing a control program, such as an Operating System (OS), to control the electronic device 100, and a Random Access Memory (RAM) 113 for storing signals or data input from an external source or for being used as a memory space for working results in the electronic device 100. The CPU 111 may include a single core, dual cores, triple cores, or quad cores. The CPU 111, ROM 112, and RAM 113 may be connected to each other via an internal bus.

The controller 110 may control the mobile communication module 120, the sub-communication module 130, the multimedia module 140, the camera module 150, the GPS module 155, the input/output module 160, the sensor module 170, the storage 175, the power supply 180, the display unit 190, and the display controller 195.

The mobile communication module 120 connects the electronic device 100 to an external device through mobile communication using at least a one-to-one antenna or a one-to-many antenna under the control of the controller 110. The mobile communication module 120 transmits/receives wireless signals for voice calls, video conference calls, Short Message Service (SMS) messages, or Multimedia Message Service (MMS) messages to/from a cell phone, a smartphone, a tablet PC, or another device, with the phones having phone numbers entered into the electronic device 100.

The sub-communication module 130 may include at least one of the WLAN module 131 and the short-range communication module 132. For example, the sub-communication module 130 may include either the WLAN module 131 or the-short range communication module 132, or both.

The WLAN module 131 may be connected to the Internet in a place where there is a wireless Access Point (AP), under the control of the controller 110. The WLAN module 131 supports the WLAN Institute of Electrical and Electronic Engineers (IEEE) 802.11x standard. The short-range communication module 132 may conduct short-range communication between the electronic device 100 and an image rendering device under the control of the controller 110. The short-range communication may include communications compatible with BLUETOOTH, a short range wireless communications technology at the 2.4 GHz band, commercially available from the BLUETOOTH SPECIAL INTEREST GROUP, INC., Infrared Data Association (IrDA), WI-FI DIRECT, a wireless technology for data exchange over a computer network, commercially available from the WI-FI ALLIANCE, NFC, and the like.

The electronic device 100 may include at least one of the mobile communication module 120, the WLAN module 131, and the short-range communication module 132 based on the performance requirements of the electronic device 100. For example, the electronic device 100 may include a combination of the mobile communication module 120, the WLAN module 131, and the short-range communication module 132 based on the performance requirements of the electronic device 100.

The multimedia module 140 may include the broadcast communication module 141, the audio play module 142, or the video play module 143. The broadcast communication module 141 may receive broadcast signals (e.g., television broadcast signals, radio broadcast signals, or data broadcast signals) and additional broadcast information (e.g., an Electric Program Guide (EPG) or an Electric Service Guide (ESG)) transmitted from a broadcasting station through a broadcast communication antenna under the control of the controller 110. The audio play module 142 may play digital audio files (e.g., files having extensions, such as mp3, wma, ogg, or way) stored or received under the control of the controller 110. The video play module 143 may play digital video files (e.g., files having extensions, such as mpeg, mpg, mp4, avi, move, or mkv) stored or received under the control of the controller 110. The video play module 143 may also play digital audio files.

The multimedia module 140 may include the audio play module 142 and the video play module 143 except for the broadcast communication module 141. The audio play module 142 or video play module 143 of the multimedia module 140 may be included in the controller 110.

The camera module 150 may include at least one of the first camera 151 and the second camera 152 for capturing still images or video images under the control of the controller 110. Furthermore, the first or second camera 151 or 152, respectively, may include an auxiliary light source (e.g., a flash) for providing an amount of light for capturing an image. The first camera 151 may be placed on the front of the electronic device 100 and the second camera 152 may be placed on the back of electronic device 100. Alternatively, the first and second cameras 151 and 152, respectively, are arranged adjacent to each other (e.g., the distance between the first and second cameras 151 and 152, respectively, may be in the range of 1 cm. to 8 cm.), capturing 3 Dimensional (3D) still images or 3D video images.

The GPS module 155 receives radio signals from a plurality of GPS satellites in orbit around the Earth, and may calculate the position of the electronic device 100 by using time of arrival from the GPS satellites to the electronic device 100.

The input/output module 160 may include at least one of the plurality of buttons 161, the microphone 162, the speaker 163, the vibrating motor 164, the connector 165, and the keypad 166.

The at least one of the buttons 161 may be arranged on the front, side or back of the housing of the electronic device 100, and may include at least one of a power/lock button, a volume button, a menu button, a home button, a back button, and a search button.

The microphone 162 generates electric signals by receiving voice or sound under the control of the controller 110.

The speaker 163 may output sounds externally corresponding to various signals (e.g., radio signals, broadcast signals, digital audio files, digital video files or photography signals) from the mobile communication module 120, sub-communication module 130, multimedia module 140, or camera module 150 under the control of the controller 110. The speaker 163 may output sounds (e.g., button-press sounds or ringback tones) that correspond to functions performed by the electronic device 100. There may be one or multiple speakers 163 arranged in at least one position on or in the housing of the electronic device 100.

The vibrating motor 164 may convert an electric signal to a mechanical vibration under the control of the controller 110. For example, the electronic device 100 in a vibrating mode operates the vibrating motor 164 when receiving a voice call from another device. There may be at least one vibration motor 164 inside the housing of the electronic device 100. The vibration motor 164 may operate in response to a touch activity or continuous touches of a user over the display unit 190.

The connector 165 may be used as an interface for connecting the electronic device 100 to the external device or a power source. Under the control of the controller 110, the electronic device 100 may transmit data stored in the storage 175 of the electronic device 100 to the external device via a cable connected to the connector 165, or receive data from the external device. Furthermore, the electronic device 100 may be powered by the power source via a cable connected to the connector 165 or may charge the battery using the power source.

The keypad 166 may receive key inputs from the user to control the electronic device 100. The keypad 166 includes a mechanical keypad formed in the electronic device 100, or a virtual keypad displayed on the display unit 190. The mechanical keypad formed in the electronic device 100 may optionally be omitted from the implementation of the electronic device 100, depending on the performance requirements or structure of the electronic device 100.

An earphone may be inserted into the earphone connecting jack 167 and thus, may be connected to the electronic device 100.

A stylus pen 168 may be inserted and removably retained in the electronic device 100, and may be drawn out and detached from the electronic device 100.

A pen-removable recognition switch 169 that operates in response to attachment and detachment of the stylus pen 168 is equipped in an area inside the electronic device 100 where the stylus pen 168 is removably retained, and sends a signal that corresponds to the attachment or the detachment of the stylus pen 168 to the controller 100. The pen-removable recognition switch 169 may have a direct or indirect contact with the stylus pen 168 when the stylus pen 168 is inserted into the area. The pen-removable recognition switch 169 generates the signal that corresponds to the attachment or detachment of the stylus pen 168 based on the direct or indirect contact and provides the signal to the controller 110.

The sensor module 170 includes at least one sensor for detecting a status of the electronic device 100. For example, the sensor module 170 may include a proximity sensor for detecting proximity of a user to the electronic device 100, an illumination sensor for detecting an amount of ambient light of the electronic device 100, a motion sensor for detecting the motion of the electronic device 100 (e.g., rotation of the electronic device 100, acceleration or vibration applied to the electronic device 100), a geomagnetic sensor for detecting a point of the compass using the geomagnetic field, a gravity sensor for detecting a direction of gravity, and an altimeter for detecting an altitude by measuring atmospheric pressure. At least one sensor may detect the status and generate a corresponding signal to transmit to the controller 110. The sensor of the sensor module 170 may be added or removed depending on the performance requirements of the electronic device 100 of the electronic device 100.

The storage 175 may store signals or data input/output according to operations of the mobile communication module 120, the sub-communication module 130, the multimedia module 140, the camera module 150, the GPS module, the input/output module 160, the sensor module 170, the display unit 190 under the control of the controller 110. The storage 175 may store the control programs and applications for controlling the electronic device 100 or the controller 110.

The term "storage" refers to the storage 175, and also to the ROM 112, RAM 113 in the controller 110, or a memory card (e.g., a Secure Digital (SD) card, a memory stick, and the like) installed in the electronic device 100. The storage may also include a non-volatile memory, a volatile memory, a Hard Disc Drive (HDD), a Solid State Drive (SSD), or the like.

The power supply 180 may supply power to at least one battery placed inside the housing of the electronic device 100 under the control of the controller 110. The at least one battery powers the electronic device 100. The power supply 180 may supply the electronic device 100 with the power input from the external power source via a cable connected to the connector 165. The power supply 180 may also supply the electronic device 100 with wireless power from an external power source using a wireless charging technology.

The display controller 195 receives information (e.g., information to be generated for making calls, data transmission, broadcast, or photography) that is processed by the controller 110, converts the information to data to be displayed on the display unit 190, and provides the data to the display unit 190. The display unit 190 displays the data received from the display controller 195. For example, in a call mode, the display unit 190 may display a User Interface (UI) or a Graphic User Interface (GUI) with respect to a call. The display unit 190 may include at least one of liquid crystal displays, thin film transistor-liquid crystal displays, organic light-emitting diodes, flexible displays, 3D displays, electrophoretic displays, and the like.

The display unit 190 may be used as an output device and also as an input device, and for the latter case, may have a touchscreen panel to operate as a touch screen. The display unit 190 may send to the display controller 195 an analog signal that corresponds to at least one touch to the UI or GUI. The display unit 190 may detect the at least one touch by a user's physical contact (e.g., by fingers including a thumb) or by a touchable input device (e.g., the stylus pen). The display unit 190 may also receive a dragging movement of a touch among at least one touch and transmit an analog signal that corresponds to the dragging movement to the display controller 195. The display unit 190 may be implemented to detect at least one touch in, for example, a resistive method, a capacitive method, an infrared method, an acoustic wave method, or the like.

The term 'touches' are not limited to physical touches by a physical contact of the user or contacts with the touchable input device, but may also include touchless proximity (e.g., maintaining a detectable distance less than 1 mm. between the display unit 190 and the user's body or touchable input device). The detectable distance from the display unit 190 may vary depending on the performance requirements of the electronic device 100 or structure of the electronic device 100, and more particularly, the display unit 190 may output different values (e.g., current values) for touch detection and hovering detection to distinguishably detect that a touch event occurred by a contact with the user's body or the touchable input device and a contactless input (e.g., a hovering event). Furthermore, the display unit 190 may output different values (e.g., current values) for hovering detection over distance from where the hovering event occurs.

The display controller 195 converts the analog signal received from the display unit 190 to a digital signal (e.g., in XY coordinates on the touch panel or display screen) and transmits the digital signal to the controller 110. The controller 110 may control the display unit 190 by using the digital signal received from the display controller 195. For example, in response to the touch event or the hovering event, the controller 110 may enable a shortcut icon displayed on the display unit 190 to be selected or to be executed. The display controller 195 may also be incorporated in the controller 110.

Further, the display controller 195 may determine the distance between where the hovering event occurs and the display unit 190 by detecting a value (e.g., a current value) output through the display unit 190, convert the determined distance to a digital signal (e.g., with a Z coordinate), and provide the digital signal to the controller 110.

Furthermore, depending on implementations, the electronic device 100 may have two or more display units.

The display unit 190 may include at least two touchscreen panels for detecting touches or proximity thereto by the user's body or the touchable input device to receive both inputs by the user's body or the touchable input device simultaneously. The at least two touchscreen panels provide different output values to the display controller 195, and the display controller 195 may differentiate inputs by the user's body and inputs by the touchable input device through the touchscreen by differently recognizing the values input from the at least two touchscreen panels.

What is claimed is:

1. A cellphone with enhanced grip surface structures, the cellphone comprising:
a body having a front surface with a display, a rear surface, a first side provided with enhanced grip surface structures that comprise at least three extensions projecting from the first side that define at least first and second concavities of the first side, and a second side, the body further having a top half above a bottom half;
wherein at least the first concavity of the first side is positioned within the top half of the body;
wherein at least the second concavity of the first side is positioned within the bottom half of the body; and
wherein the first and second concavities of the first side are at least about 0.5 inches wide and have a substantially continuous radius of curvature with a range of about 0.5 inches to about 2.0 inches.

2. The cellphone with enhanced grip surface structures of claim 1 wherein the second side of the body is provided with the enhanced grip surface structures that further comprise at least three extensions projecting from the second side that define at least first and second concavities of the second side.

3. The cellphone with enhanced grip surface structures of claim 2 wherein at least the first concavity of the first side and the first concavity of the second side define a first pair of concavities positioned within the top half of the body, and at least the second concavity of the first side and the second concavity of the second side define a second pair of concavities positioned within the bottom half of the body.

4. The cellphone with enhanced grip surface structures of claim 2 wherein the first and second concavities of the second side are at least about 0.5 inches wide and have a substantially continuous radius of curvature with a range of about 0.5 inches to about 2.0 inches.

5. The cellphone with enhanced grip surface structures of claim 1 wherein the at least three extensions projecting from the first side are integrally attached to the body.

6. The cellphone with enhanced grip surface structures of claim 1 wherein the body has an intermediate frame positioned between the front surface and the rear surface.

7. The cellphone with enhanced grip surface structures of claim 1 wherein the first and second concavities of the first side are symmetrically spaced along a length of the cellphone.

8. The cellphone with enhanced grip surface structures of claim 2 wherein a number of concavities of the first side is different from a number of concavities of the second side.

9. The cellphone with enhanced grip surface structures of claim 1 wherein the display comprises a touch screen display.

10. A cellphone comprising:
a touch screen display;
electronics connected to the touch screen display;
a housing enclosing the electronics and connected to the touch screen display, the housing comprising a first side and a second side;
wherein the first side of the housing includes at least two exposed projections defining at least one concavity of the first side therebetween, the at least one concavity of the first side is at least about 0.5 inches wide, and the at least one concavity of the first side provides at least one enhanced grip surface structure for the housing.

11. The cellphone of claim 10 wherein the second side of the housing includes at least two exposed projections defining at least one concavity of the second side therebetween.

12. The cellphone of claim 11 wherein the at least one concavity of the second side is at least about 0.5 inches wide, and the at least one concavities of the first and second sides provide the enhanced grip surface structures for the housing.

13. The cellphone of claim 10 further comprising a camera located within the housing, the housing further comprising a front surface and a rear surface, the camera including a camera lens exposed on the front surface or the rear surface.

14. The cellphone of claim 11 wherein at least one concavity selected from the group consisting of the at least one concavity of the first side and the at least one concavity of the second side has a maximum depth of approximately 75% of a thickness of the cellphone.

15. The cellphone of claim 11 wherein the at least one concavities of the first and second sides have a depth greater than about 1 mm.

16. The cellphone of claim 11 wherein the at least one concavities of the first and second sides have a substantially continuous radius of curvature.

17. The cellphone of claim 16 wherein the substantially continuous radius of curvature has a range of about 0.5 inches to about 2.0 inches.

18. The cellphone of claim 10 wherein the touch screen display defines a front facing surface of the cellphone.

19. A housing for a cellphone having a touch screen display, the housing comprising:
- at least first, second, third, fourth and fifth projections defining first, second, third, and fourth concavities;
- wherein each of the first, second, third, and fourth concavities has a substantially continuous radius of curvature with a range of about 0.5 inches to about 2.0 inches; and
- wherein the first and second concavities are disposed on an upper half of a body of the cellphone and the third and fourth concavities are disposed on a lower half of the body of the cellphone.

20. The housing of claim 19 wherein each of the first, second, third, and fourth concavities has a depth greater than about 1 mm.

21. The housing of claim 19 wherein each of the first, second, third, and fourth concavities has a maximum depth of approximately 75% of a thickness of the cellphone.

22. The housing of claim 19 wherein each of the first, second, third, and fourth concavities are at least about 0.5 inches wide.

23. The housing of claim 19 wherein the first and second concavities are symmetrically spaced on the upper half of the body of the cellphone.

24. The housing of claim 19 wherein the first and second concavities are asymmetrically spaced on the upper half of the body of the cellphone.

25. The housing of claim 19 wherein the first and second concavities are symmetrically spaced on the upper half of the body of the cellphone and the third and fourth concavities are asymmetrically spaced on the lower half of the body of the cellphone.

* * * * *